United States Patent [19]

Klein

[11] Patent Number: 4,464,654
[45] Date of Patent: Aug. 7, 1984

[54] TIME INDEPENDENT LOGIC SYSTEM FOR RIP DETECTORS

[75] Inventor: Richard G. Klein, Avon Lake, Ohio

[73] Assignee: The B. F. Goodrich Company, Akron, Ohio

[21] Appl. No.: 454,337

[22] Filed: Dec. 29, 1982

Related U.S. Application Data

[63] Continuation of Ser. No. 246,140, Mar. 23, 1981.

[51] Int. Cl.³ ............................................. G08B 21/00
[52] U.S. Cl. .................................... 340/676; 198/502; 198/856
[58] Field of Search ................ 340/676; 198/856, 502; 226/11, 100

[56] References Cited

U.S. PATENT DOCUMENTS

| | | | |
|---|---|---|---|
| 3,792,459 | 2/1974 | Snyder | 198/502 |
| 3,922,661 | 11/1975 | Enabnit et al. | 340/676 |
| 4,106,005 | 8/1978 | Asakawa | 340/676 |
| 4,228,513 | 10/1980 | Doljack | 198/856 |

Primary Examiner—Glen R. Swann, III
Attorney, Agent, or Firm—Maky, Renner, Otto & Boisselle

[57] ABSTRACT

A rip detector system accurately monitors the integrity of a conveyor belt or the like substantially as a function of signals that establish a variable time frame determined according to belt speed and a further signal representing integrity. The belt includes rip sensors or antennas, for example embedded therein. Three detectors at related spaced apart locations relative to the conveyor belt system monitor the integrity of the antennas as an indication of the integrity of the belt. Two of the detectors are located upstream, i.e. relative to the belt travel direction, of a location frequently prone to encountering rips to produce information indicating both that an integral antenna has been detected and the effective speed of the belt, i.e. a speed relative time frame in which presence of that antenna at the third detector can be expected. The third detector is located downstream of the rip-prone location of the conveyor belt system.

40 Claims, 6 Drawing Figures

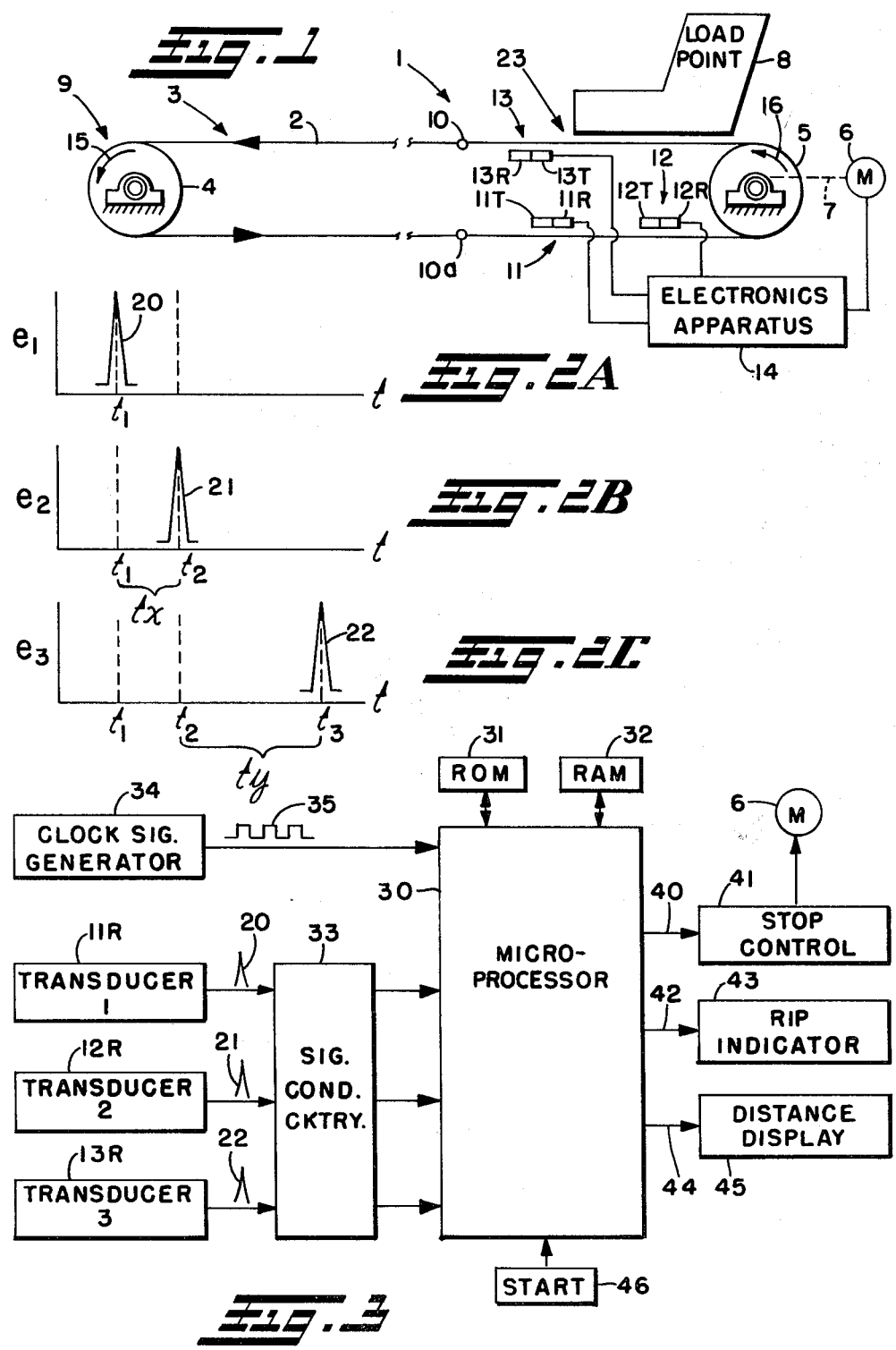

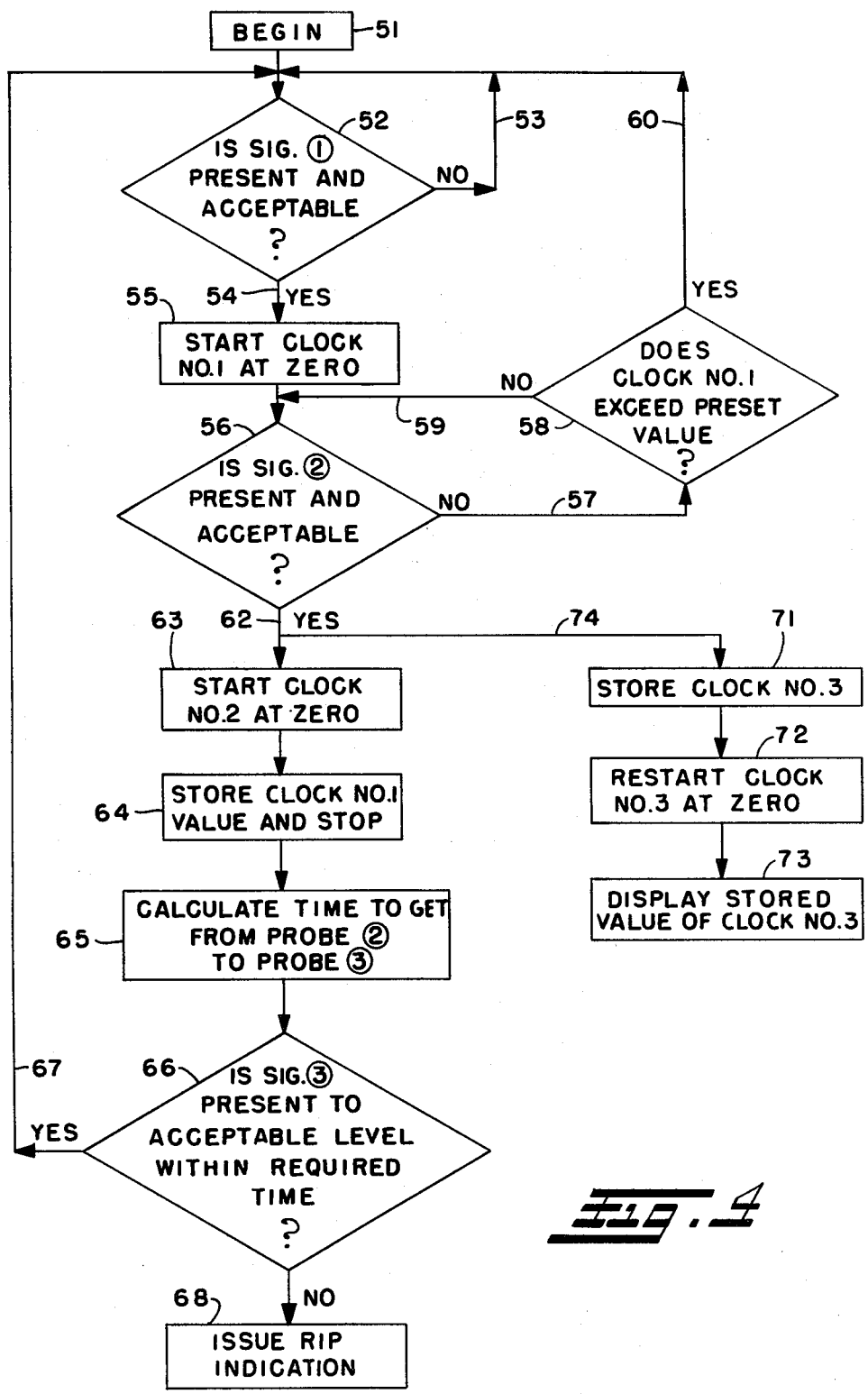

TIME INDEPENDENT LOGIC SYSTEM FOR RIP DETECTORS

This is a continuation of application Ser. No. 246,140, filed Mar. 23, 1981.

TECHNICAL FIELD

The present invention relates to apparatus and method for detecting whether specified events in a process occur within a predetermined time frame and, more particularly, to apparatus and method for detecting rips in conveyor belts or the like.

BACKGROUND

In large endless non-metallic conveyor belts used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective integral antennas as they pass a rip detector station and capacitively couple therewith a transmitter and a receiver respectively located near opposite edges of the belt. However, a broken antenna, for example at a place where the belt has been ripped, will not couple the transmitter signal through to the receiver, and a detector circuit, then, senses the same as an indication of the occurrence of a rip condition. The detector circuit in such patent is operative after the lapse of a predetermined time period, which corresponds to the time required for the passage of a given number of broken antennas past the rip detector station without the coupling of the transmitter signal to the receiver, to produce a distinguishable output that activates an alarm and/or deactivates the conveyor belt drive.

A particular disadvantage with the system of U.S. Pat. No. 3,792,459 is the inability to provide accurate rip detector function during acceleration and deceleration periods of the belt, which can be a critical time when rip monitoring is desirable, for by providing accuracy of detection during slow operation of the belt, the accuracy of detection during full speed belt operation is reduced. The undesirable inaccuracy of such prior rip detector due to the long waiting period to see whether after an antenna has been missed the next antenna is detected and/or at least to accommodate the largest spacing between adjacent antennas means that a rather long and expensive to repair rip may occur before the conveyor is shut down. Moreover, since such conveyor belts are known to stretch, for example on the order of about 20%, during useful life, the indicated waiting period must be adequately long to accommodate the lengthened belt, thus further reducing the accuracy of detection and promptness of shut-down.

Sometimes an antenna in a belt may become worn so as not to provide a reliable signal. For example, the antenna may be broken intermediate its ends, but sometimes the ends touch to couple a weak signal between the transmitter and receiver and sometimes the ends may not touch. Such antennas, then, are unreliable and may cause unnecessary nuisance shut-downs.

Several of the disadvantages encountered in prior art rip detector systems have been overcome by the apparatus and method disclosed in commonly assigned U.S. Pat. No. 4,228,513. In such rip detector system the location of each antenna in the belt is stored electronically as a function of belt position, for example, which is sensed by a tachometer. When an anticipated antenna is not sensed at a detector station, including a transmitter and receiver, such failure of detection may be sensed and used to cause shut-down of conveyor system. As a valid antenna passes the detector station, information concerning the actual location of the antenna is updated, thus providing compensation for belt stretching. Additionally, information concerning location of a worn or broken antenna where the belt integrity is satisfactory can be deleted from memory.

A signal detection circuit especially for rip detectors is disclosed in commonly assigned U.S. patent application Ser. No. 871,664, filed Jan. 23, 1978, now U.S. Pat. No. 4,229,735, issued Oct. 21, 1980. Such circuit avoids falsely responding to a noise signal as an indication of an antenna presence. Such circuit also provides wave shaping of a signal properly received from an antenna to optimize response of detector circuitry thereto.

SUMMARY OF THE INVENTION

The area of a rip detector at which rips are most frequently encountered is the loading area, i.e., that point on the conveyor system where ore or other material is loaded onto the conveyor for transport downstream. In the present invention rip detector protection is provided for a single area, such as the loading area of a conveyor belt, and that protection is provided in a general or real time frame independent manner while maintaining accuracy of sensing over a variety of conveyor belt speeds. Rather, the operative time frame within which the invention is functional is variable, being determined by the actual belt speed. As a result, the inaccuracies encountered with the time dependent prior rip detector systems are avoided.

Briefly, in accordance with the present invention, three detector stations and an electronic logic and control apparatus are employed. The three detector stations detect respective antennas in a conveyor belt. The first two detector stations are located upstream of the loading area for the conveyor belt, and the third detector station is located downstream of the loading area. The relative spacing of the detector stations is pre-established or known. Upon sensing an antenna having passed the first and second detector stations, the logic apparatus can predict when the antenna should be expected to arrive at the third detecting station. Failure of such arrival is indicative of a rip having occurred at the loading station.

According to one aspect of the present invention, then, an apparatus and method are provided for detecting whether in a process of sequentially occurring specified events such events occur at a proper location, including a first means for detecting the occurrence of such a specified event, a second means positioned in a predetermined relation to the first means for detecting occurrence of such event after the first means has detected the same, a third means positioned in a predetermined relation to the second means for detecting occurrence of such event after the second means has detected the same, means for sensing the period between detections of such event by the first and second means as a representation of the speed of the process, and means responsive to the magnitude of such period and the positional relation of the second and third means for establishing a variable time frame, which is a function of the process speed, that such event would be expected to occur at the third means.

According to another aspect of the invention an apparatus and method are provided for detecting rips in a conveyor, itself including a means for representing the integrity thereof, say, for example, antennas, and means for moving the conveyor, including first, second and third detector means for detecting the antennas as an indication of belt integrity, means for positioning the first, second and third detector means in predetermined spaced relation to each other, and means for sensing the time period between detections of an antenna by the first and second detector means to establish a time at or within which detection of such antenna by the third detector means would be expected to occur. If the antenna were not detected when expected, the same would be indicative of a rip occurring, and control means may be provided to shut down the conveyor to minimize damage to the belt.

With the foregoing in mind, a primary object of the present invention is to detect sequentially occurring events and, more particularly, to monitor the integrity of a conveyor belt by sensing integrity representing means (antennas) contained in the belt.

Another object is to reduce the complexity and comprehensiveness of software and hardware required in the past to provide accurate rip detector protection over a wide range of speeds for a conveyor belt or the like.

Another object is semi-mechanically to detect the speed of a conveyor belt or the like and to detect rips therein.

An additional object is to provide time insensitivity for an endless conveyor rip detector system by using the conveyor belt speed to establish a time frame independent of real time.

A further object is to provide accurate rip detector protection for a conveyor belt or the like during acceleration and deceleration of the belt and during substantially constant speed operation thereof.

Still another object is to facilitate obtaining accurate rip detector function for a conveyor belt rip detector at a predetermined location therealong.

Still an additional object is to provide an improved system for detecting cyclical events at prescribed locations in a time independent cyclical process.

Still a further object is to indicate the distance between usable rip sensors in a conveyor belt.

Even another object is to minimize dilution of rip detection and protection accuracy as rip sensors wear or are disabled.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic illustration of a conveyor belt rip detector system in accordance with the present invention;

FIGS. 2A, 2B and 2C are graphical representations of signals occurring at the first, second and third detector stations of the rip detector system of FIG. 1;

FIG. 3 is a schematic electric circuit block diagram of the electronic apparatus associated with the rip detector system of FIG. 1; and FIG. 4 is a computer program flow chart depicting operation of the electronic apparatus of FIG. 3 in the rip detector system of FIG. 1 to detect rips in the conveyor belt.

DESCRIPTION OF THE PREFERRED EMBODIMENT

Referring now in detail to the drawings wherein like reference numerals designate like parts in the several figures, and initially to FIG. 1, a rip detector system 1 in accordance with the present invention for monitoring the integrity, and particularly for sensing rips, in a conveyor belt 2 of a conveyor belt system generally designated 3 is illustrated. The conveyor belt system 3 includes two or more wheels or pulleys 4, 5 on which the belt 2 is mounted for movement as the wheels are turned, for example, by a motor or other prime mover 6, attached by a representative drive shaft 7 to the wheel 5. At the load point 8 ore or other material is loaded onto the belt 2 in conventional manner, and such material usually is discharged at a discharge point 9 at or near the relatively downstream end of the belt 2 proximate the wheel 4 as the belt turns around the latter; alternatively, other take-off means may be provided to remove the material from the belt.

The belt 2 contains a plurality of means 10 for representing the integrity of the belt 2 at specified locations thereof. Such means 10 in accordance with the preferred embodiment and best mode of the present invention are elongate wire conductors actually embedded in the material of the belt 2, which preferably is formed of electrically non-conductive material, such as rubber or rubber-like material. Preferably the antennas 10 are of the elongate electrically conductive type disclosed in U.S. Pat. No. 3,792,459, although other types of antennas may be used to represent belt integrity. Such preferred antennas 10 are capable of capacitive coupling with the transmitter and receiver of a detector station also disclosed in such patent. As an antenna passes a detector station, a transmitter adjacent one side of the belt capacitively couples an electrical signal to the antenna; if the antenna is whole and non-fatigued, such antenna relatively efficiently capacitively couples such signal to the receiver located at the opposite side of the belt. Receipt of such signal at the receiver indicates satisfactory integrity of the conveyor belt. The belt 2 may include one and preferably a plurality of such antennas 10, the spacing thereof being a function of belt construction economics and the desired level of rip detector protection preferred.

Fundamentally the rip detector system 1 includes first, second and third detector stations 11, 12, 13, such as of the type disclosed in U.S. Pat. No. 3,792,459, the disclosure of which is hereby incorporated by reference. The first and second detector stations 11, 12 are located upstream from the load point 8 relative to the travel direction of the belt 2, and the third detector station 13 is located just downstream of the load point 8. The relative locations or spacing of the detector stations 11-13 is pre-established or known. Each detector station includes a transmitter 11T, 12T, 13T and a receiver 11R, 12R, 13R. Although the transmitter and receiver of each station are shown linearly along the belt in the single plane of the drawing, it will be appreciated that at each station the transmitter and receiver there are positioned near opposite edges or sides of the belt. The rip detector system 1 also includes an electronics apparatus 14, which will be described in greater detail below.

Using three detector stations and knowing their relative spacing, the rip detector system 1 may be used in a real time independent mode of operation to maintain a high level of rip detector function accuracy, which is governed by antenna spacing and detector station spacing that establish a relative time frame as a function of belt speed for antenna detection. Therefore, the inaccuracies incumbent on prior systems in which real time periods had to be adequately long to accommodate belt stretching, broken antennas, starting and stopping, and the like, resulting in substantial inaccuracy of rip detector function, is avoided.

More particularly, during operation of the rip detector system 1, as the conveyor belt system 3 moves the belt 2 in the direction of the arrows 15, 16, as driven by the energized motor 6, when an antenna, say antenna 10a, passes the first detector station 11, a first electrical signal 20 (FIG. 2A), preferably in the form of a DC pulse, is produced at time $t_1$. When the antenna 10a passes the second detector station 12, a second signal pulse 21 is produced at time $t_2$. Since the spacing between the detector stations 11, 12 is known, the time period $t_x$ (FIG. 2B) between times $t_1$ and $t_2$ is proportionally representative of the belt speed. Knowing the distance between the second and third detector stations 12, 13 and the magnitude of the time period $t_x$, the time frame $t_y$ (FIG. 2C) or the time $t_3$ at which the third signal pulse 22 when the antenna 10a would be expected to be detected at the third detector station 13 can be predicted or calculated with a relatively high degree of accuracy. Such detection, then, represents good integrity of the belt 2; failure of detection by time $t_3$ or a short time thereafter, for example, would indicate a failure of the antenna 10a as a representation of a rip, whereupon the electronics apparatus 14 may be operated automatically to stop the belt 2, say by deenergizing the motor 6 and/or applying appropriate braking action.

Thus, the rip detector system 1 is effectively independent of real time; rather, the time frame in which the system 1 operates is a function of the speed of the belt 2. Therefore, accuracy of rip detector function will be determined by the spacing of the antennas 10 in the belt 2 and by the spacing of the detector stations 11-13. Ordinarily there will be no need continuously to store accurate information concerning the location of all the antennas in the belt 2. In the most simplified form of the rip detector system 1, the spacing between antennas 10 would be such that only a single antenna would be within the sensing area 23, i.e. at a location along the belt between the first and third detector stations 11, 13 at any one time. However, if desired, a smaller spacing between the antennas may be employed as long as means are provided in the rip detector system 1 to account for the plural antennas that may occur at one time in the sensing area 23. A broken or substantially fatigued antenna in the belt 2 at an area of the belt that is not ripped ordinarily will not be sensed by the first and/or second detector station; therefore, searching therefor by the third detector station 13 will not occur and nuisance shut-downs will be avoided.

Operation of the rip detector system 1 is predicated on the assumption that the most likely area at which a rip may occur would be at the loading point 8; initiation of each rip detector cycle of operation, then, will be effected by passage of a valid effective antenna 10 sequentially past both the first and second detector stations 11, 12. The system 1 is operative to detect whether in the process of sequentially occurring specified events, namely the passage of antennas 10 past the several detector stations, or other events, such events occur at appropriate time periods that themselves are a function of the speed of operation of the process.

Turning now to FIG. 3, electronics apparatus 14 illustrated there in accordance with the preferred embodiment and best mode of the present invention utilizes a microprocessor 30 having directly associated therewith an operative set of program instructions contained in a read only memory (ROM) 31 and also having associated therewith a random access memory (RAM) 32 for conventional purposes. The transducer or receiver 11R, 12R, 13R from each detector station 11, 12, 13 is coupled to provide the signal pulses 20, 21, 22 via signal conditioning circuitry 33 to the microprocessor 30. The signal conditioning circuitry 33 may be of the type disclosed in the above mentioned U.S. patent application Ser. No. 871,664, with a separate one of such circuits being associated with each transducer 11R-13R. The circuit 33 may also discriminate between valid antenna signals and noise. A conventional clock signal generator 34 provides clock pulses 35 to the microprocessor 30.

Output line 40 from the microprocessor 30 is connected to a conventional stop control circuit 41, such as a deenergizing solenoid arrangement that disconnects power from the motor 6 and which also may operate a brake system for the conveyor belt system 3 when a rip has been detected. Output line 42 from the microprocessor 30 is connected to a rip indicator 43, which provides a visual display, for example, indicating that a rip has been detected. Moreover, output line 44 from the microprocessor is coupled to a distance display device 45, which displays the distance between adjacent antennas in the belt, as will be described further below.

During operation of the rip detector system 1 in conjunction with the conveyor belt system 3, the electronics apparatus 14 monitors passage of respective antennas 10 by the detector stations 11-13. In the event a rip has been detected, the electronics apparatus 14 may be operative to shut down the conveyor belt to minimize rip damage. Such operation now will be summarized in conjunction with reference below to the computer program summary depicted in the flow chart of FIG. 4. The flow chart may be reduced to machine language program statements as may be required to control operation of the microprocessor 30 or other central processor unit and of the overall electronics apparatus by a person having ordinary skill in the art. Such computer program may be stored in the ROM 31 and used to effect operation of the overall electronics apparatus 14 after a start switch 46 has been operated by manual closure effected by the system operator.

Referring in detail to FIG. 4, when the start switch 46 is closed, the electronics apparatus 14 is initialized in conventional manner, for example, as represented by the block 51 labeled Begin. Initialization may include automatic checking of the various portions of electronics apparatus 14, and energization of the clock signal generator 34 to produce the fixed frequency clock pulse 35 and of the detector stations 11–13. The initialization procedure also would include appropriate operation of the stop control 41 to permit energization of the motor 6 to drive the belt 2.

Thereafter, a cyclical loop is entered at block 52 with an inquiry being made to sense whether the first antenna signal 20 is present and at an acceptable level representing presence of a whole antenna 10a, for example, at the first detector station 11. If a fatigued or otherwise defective antenna passes the station 11 and produces a signal 20 that is of too small a level, the circuit 33 may act as a discriminator to treat such signal as though it were noise, and line 53 would be followed to continue the waiting loop until a valid antenna has been sensed.

Upon sensing the presence of such valid antenna at block 52, then, line 54 is followed to block 55 at which time an internal clock counter mechanism is initiated in the microprocessor 14, whereby pulses from the clock signal generator 34 begin to be counted. Such clock pulses continue to be counted as an inquiry is made at block 56 to sense whether the second signal 21 of an acceptable level is present at the second detector station 12. Initially such second signal will not be sensed; therefore, line 57 will be followed and a further inquiry is made at block 58 to determine whether the value of the first clock, e.g. the number of clock pulses counted by the first internal clock of the microprocessor 30, has exceeded a preset value. If such preset value has not been exceeded yet, line 59 is followed until either signal 21 is detected at block 56 or such preset value has been exceeded at block 58. If such preset value has been exceeded at block 58, then, the first signal 20 detected at block 52 is treated as though it were a noise signal and not a valid antenna present signal and line 60 is followed back to the beginning of block 52. Accordingly, if the signal sensed at block 52 were due to a fatigued antenna that temporarily provided an efficient coupling between the transmitter and receiver 11T, 11R of the first detector station 11, but no longer was effectively operable to produce satisfactory coupling at the second detector station 12, the use of such antenna for rip detector purposes is discarded during the immediate cycle of the conveyor belt system 3.

If the second signal 21 were detected at block 56, line 62 would be followed to block 63 at which a second internal clock of the microprocessor 30 would be set to zero and started counting clock pulses 35 from the clock signal generator 34. The then immediate value of the first clock would be stored at block 64, and that first clock also would be stopped. Knowing the distance between the second and third detector stations 12, 13 and the time it took for an antenna to move from the first to the second detector station, as was stored at block 64, the time $t_3$ at which the antenna should reach the third detector station 13 is calculated at block 65.

Thereafter, an inquiry is made at block 66 to see whether the third signal 22 is present at the third detector station 13 at an acceptable level within the required time $t_y$; if affirmative, line 67 is followed back to block 52 to await the detection of the presence of the next antenna at the first detector station 11. However, if the response to the inquiry made at block 66 is negative, the same represents failure of the antenna due possibly to breakage of the antenna caused by a rip in the belt whereupon a rip indication is issued at block 68. The microprocessor 30 then operates the stop control 41 (FIG. 3) to stop the belt 2. Rip indicator 43 also may be energized to indicate at a control panel that the belt has been stopped. Thereafter, an operator may inspect the belt and order a repair and restarting of the belt. If the operator does not find a rip, the issuance of a rip indication at block 68 may have been caused by a defective antenna, for example, whereupon the operator may restart the rip detector system 1 and conveyor belt system 3 by operating the start switch 46 again.

Referring to blocks 71, 72, 73 in FIG. 4, the same are provided to obtain a display of the expected time between which antennas occur in the belt or the physical distance separation between the antennas. For example, during the initialization procedure at block 51, a third clock is initialized to zero. When the first antenna is detected at the second detector station 12, as is represented by an affirmative response at block 56, following line 74, the value of the third clock is stored in memory, say in the RAM 32, as is represented at block 71. Thereafter, at block 72 the third clock is restarted at zero and at block 73 the previously stored value of the third clock, i.e. that value stored at block 71, is displayed, say in the distance display 45. The third clock continues running until the next antenna is detected at the second detector station 12 at which time the value then on the third clock is stored at block 71; the third clock is restarted at zero at block 72; and the just-stored value of the third clock is displayed at block 73 representing the time between the detections of the first and second antennas at the second detector station 12 at the given speed of the belt. Such information, if desired, may be converted to distance information if conventional means, such as a tachometer, also obtains the immediate speed of the belt. The information also could be directly related to distance between antennas if the clock signal generator 34 itself were made to produce a clock pulse signal 35 having a frequency directly related to the actual speed of the belt.

Moreover, it will be appreciated by making the frequency of the clock signal pulse 35 directly proportional to the speed of the belt, maximum accuracy of the rip detector system 1 can be achieved. However, if the spacing of the detector stations 11–13 were adequately close and the frequency of the clock signal pulse fixed at an adequately high frequency, the accuracy of rip detector system 1 may be adequate so long as the rate of change of belt speed ordinarily would be relatively slow. In either case, though, accuracy of rip detector capability over a wide range of belt operating conditions, such as during acceleration, deceleration and relatively fixed speed operation will be achieved.

Although the electronic circuit illustrated and described above refers to microprocessor controlled circuitry using a computer program for controlling operation thereof, overall operation of the invention also may employ hard wired logic and timing circuitry to perform the equivalent functional and control operation as the illustrated and described preferred embodiment of electronics apparatus 14.

In using the rip detector system 1, then, for detecting whether in the process of sequentially occurring specified events the events occur appropriately, occurrence of the event is detected initially by the detector station 11 at a first location. Subsequently occurrence of the event is detected at a second location, i.e. the detector station 12, located a predetermined distance from the first location. Subsequently detection is sought for occurrence of the event at a third location, i.e. at the third detector station 13, a predetermined distance relation from the second detector station. The period between the first and second detections is sensed as a representation of the speed of the process, and in response to the magnitude of such period and the distance between the second and third detector stations a time frame is established within which the event would be expected to occur at the third detector station.

More specifically, in connection with use of the rip detector system 1 for detecting rips in a conveyor belt including antennas or other means for representing the integrity of the conveyor and means for moving the conveyor, at first, second and third locations the presence of the antenna is detected. The time period between the first and second detections is used to establish a time period within which the third detection would be expected to occur. In the event such third detection were not to occur as anticipated, the existence of a rip or other fault may be assumed and shut down of the process, i.e., conveyor operation, or other appropriate steps are effected.

STATEMENT OF INDUSTRIAL APPLICATION

With the foregoing in mind, it will be appreciated that the present invention provides for detection of rips in a conveyor belt system and, more broadly speaking, the monitoring of sequentially occurring events in a process as a function of the actual speed of the process and substantially independently of real time.

I claim:

1. A rip detector apparatus for a conveyor, including means for representing the integrity of such conveyor and means for moving such conveyor, comprising first, second and third detector means for detecting said means for representing as an indication of integrity of the conveyor belt, said first, second and third detector means being a predetermined distance from each other, means for sensing the time period between detections of a means for representing by said first and second detector means to establish a time frame within which detection of such means for representing by said third detector means would be expected to occur, and means for sensing an apparent lack of integrity of such conveyor when said third detector means fails to detect a means for representing within said established time frame.

2. The apparatus of claim 1, further comprising stop means for stopping such conveyor belt if said third detector means fails to detect a means for representing within said established time frame.

3. The apparatus of claim 1, said means for representing comprising conductors which may break when a rip occurs in the conveyor, and said first, second and third detector means comprising means for coupling a signal to respective conductors and means for receiving a signal from said conductors as an indication of the integrity thereof.

4. The apparatus of claim 1, further comprising means for detecting the relative spacing between respectively adjacent means for representing.

5. The apparatus of claim 4, further comprising means for displaying such relative spacing as a function of time.

6. Apparatus for detecting whether, in a process of sequentially occurring specified events, such events occur as expected, comprising first means for detecting occurrence of such a specified event, second means positioned a predetermined distance from said first means for detecting occurrence of such event after said first means has detected the same, third means positioned a predetermined distance from said second means for detecting occurrence of such event after said second means has detected the same, means for sensing the period between detections of such event by said first and second means as a representation of the speed of such process, means responsive to the magnitude of such period and of the distance between said second and third means for establishing a time frame within which such event would be expected to be detected at said third means, and means for sensing an apparent failure to detect such event by said third means when said third means fails to detect such event within said established time frame.

7. The apparatus of claim 6, such process comprising the cyclical operation of a conveyor belt, including means for representing integrity of such conveyor belt, and wherein said first, second and third means comprise respective detector means for detecting such means for representing.

8. The apparatus of claim 7, further comprising stop means for stopping such conveyor belt if said third detector means fails to detect a means for representing within said established time frame.

9. The apparatus of claim 7, said means for representing comprising conductors which may break when a rip occurs in the conveyor, and said first, second and third detector means comprising means for coupling a signal to respective conductors and means for receiving a signal from said conductors as an indication of the integrity thereof.

10. A method for detecting rips in a conveyor belt, including means for representing the integrity of such conveyor belt and means for moving such conveyor belt, comprising detecting at first, second and third locations positioned a predetermined distance from each other such means for representing as an indication of the integrity of such conveyor belt, sensing the time period between first and second detections of a means for representing to establish a time period within which said third detection would be expected to occur, and sensing an apparent lack of integrity of such conveyor when said third detector means fails to detect a means for representing within said established time frame.

11. The method of claim 10, further comprising stopping such conveyor belt if said third detection does not occur or occurs outside the predetermined time.

12. The method of claim 10, wherein such means for representing includes conductors, and said detecting comprises transmitting a signal to respective conductors and receiving a signal coupled by a conductor from a transmitter as an indication of the integrity of such conductor and, thus, the conveyor belt.

13. The method of claim 10, further comprising detecting the relative spacing between adjacent means for representing.

14. The method of claim 13, further comprising displaying the detected spacing between adjacent means for representing.

15. A method for detecting, substantially independently of real time, whether, in a process of sequentially occurring specified events, such events occur with a predetermined time period, comprising detecting occurrence of such a specified event at a first location, subsequently detecting occurrence of such event at a second location positioned a predetermined distance from such first location, subsequently detecting occurrence of such event at a third location positioned a predetermined distance from to such second location, sensing the period between said first and second detections of such event as a representation of the speed of such process, in response to the magnitude of such period and the distance between such second and third locations establishing a time period within which such third detection would be expected to occur, and sensing an apparent failure to detect such event by said third means when said third means fails to detect such event within said established time period.

16. The method of claim 15, wherein such process is the cyclical operation of an endless conveyor which includes means for representing the integrity of such conveyor, and wherein said steps of detecting comprise detecting the integrity of such means for representing.

17. The method of claim 16, further comprising stopping such conveyor belt if said third detection does not occur or occurs outside the predetermined time.

18. The method of claim 16, wherein such means for representing includes conductors, and said detecting comprises transmitting a signal to respective conductors and receiving a signal coupled by a conductor from a transmitter as an indication of the inegrity of such conductor and, thus, the conveyor belt.

19. The method of claim 16, further comprising detecting the relative spacing between adjacent means for representing.

20. The method of claim 19, further comprising displaying the detected spacing between adjacent means for representing.

21. A rip detector system for an endless conveyor belt system, including an electrically non-conductive endless conveyor belt and means for driving the same to carry material from a load point to a discharge point, comprising antenna means in the belt for representing the integrity of the belt, first, second and third detector means for detecting integral antenna means in the belt, said first and second detector means being positioned at spaced-apart locations upstream of such load point and said third detector means being positioned relatively downstream of such load point, and means coupled to said detector means for sensing whether an antenna means has been validly detected by said first and second detector means, to sense the effective speed of the conveyor belt, to determine a time period within which such validly detected antenna means should be detected at said third detector means, and to respond to detection or non-detection of such antenna means at such third detection means within said time period.

22. The apparatus of claim 21, wherein each of said detector means comprises a radio frequency transmitter and a radio frequency receiver and means for capacitively coupling said transmitter and said receiver to respective antenna means passing thereby.

23. The apparatus of claim 21, said means for sensing comprises an electronics apparatus including a microprocessor having a memory with programming for controlling operation of said microprocessor cupled thereto and input connections to said detector means.

24. The apparatus of claim 23, further comprising means for stopping the conveyor belt when said third detector means fails to detect a valid antenna means within said time period.

25. The apparatus of claim 21, further comprising means for stopping the conveyor belt when said third detector means fails to detect a valid antenna means with said time period.

26. A rip detector apparatus for a conveyor, including means for representing the integrity of such conveyor and means for moving such conveyor, comprising relatively upstream and relatively downstream detector means for detecting said means for representing an indication of integrity of the conveyor belt, said detector means being a predetermined distance from each other, means responsive to said relatively upstream detector means detecting a means for representing to establish a time frame within which detection of such means for representing by said relatively downstream detector means would be expected to occur, and means for sensing an apparent lack of integrity of such conveyor when said relatively downstream detector means fails to detect a means for representing within said established time frame.

27. The apparatus of claim 26, further comprising stop means for stopping such conveyor belt if said relatively downstream detector means fails to detect a means for representing within said established time frame.

28. The apparatus of claim 26, said means for representing comprising conductors which may break when a rip occurs in the conveyor, and each of said detector means comprising means for coupling a signal to respective conductors and means for receiving a signal from said conductors as an indication of the integrity thereof.

29. The apparatus of claim 26, further comprising means for detecting the relative spacing between respectively adjacent means for representing.

30. The apparatus of claim 29 further comprising means for displaying such relative spacing as a function of time.

31. The apparatus of claim 26, said upstream detector means comprising first and second detector means positioned a predetermined distance from each other and from said relatively downstream detector means, and said means responsive to said relatively downstream detector means comprising means for sensing the time period between detections of a means for representing by said first and second detector means to establish such time period.

32. The apparatus of claim 26, further comprising means coupled to said relatively upstream detector means for sensing whether means for representing has been validly detected.

33. The apparatus of claim 32, said relatively upstream detector means comprising first and second detector means spaced apart relative to each other along the path of the conveyor belt, and said means for sensing comprising means for sensing whether a means for representing has been validly detected by both said first and second detector mean within a predetermined period.

34. A method for detecting rips in a conveyor belt, including means for representing the integrity of such conveyor belt and means for moving such conveyor belt, comprising detecting at relatively upstream and relatively downstream locations positioned a predetermined distance from each other such means for representing as an indication of the integrity of such conveyor belt, based on detection of a means for representing at such relatively upstream location establishing a time period within which said relatively downstream detection would be expected to occur, and sensing an apparent lack of integrity of such conveyor when at said relatively downstream location there is a failure to detect a means for representing within said established time frame.

35. The method of claim 34, further comprising stopping such conveyor belt if said relatively downstream detection does not occur or occurs outside the predetermined time.

36. The method of claim 34, wherein such means for representing includes conductors, and said detecting comprises transmitting a signal to respective conductors and receiving a signal coupled by a conductor from a transmitter as an indication of the integrity of such conductor and, thus, the conveyor belt.

37. The method of claim 34, further comprising detecting the relative spacing between adjacent means for representing.

38. The method of claim 37, further comprising displaying the detected spacing between adjacent means for representing.

39. The method of claim 34, wherein such relatively upstream location comprises first and second locations positioned a predetermined distance from each other and from such relatively downstream location, said detecting at such relatively upstream location comprises detecting such means for representing at such first and second locations, and said establishing comprising sensing the time period between detections of a means for representing at such first and second locations.

40. The method of claim 39, further comprising determining whether a means for representing has been validly detected at both said first and second relatively upstream locations within a predetermined period.

* * * * *